J. W. CRAIG.
CLOTHES PINS.

No. 183,645. Patented Oct. 24, 1876.

Witnesses:
P. R. Richards,
C. N. Speed

Inventor:
John W. Craig,
By W. B. Richards,
Atty.

UNITED STATES PATENT OFFICE.

JOHN W. CRAIG, OF KIRKWOOD, ILLINOIS, ASSIGNOR OF ONE-HALF HIS RIGHT TO THOS. W. BEERS, OF SAME PLACE.

IMPROVEMENT IN CLOTHES-PINS.

Specification forming part of Letters Patent No. 183,645, dated October 24, 1876; application filed August 29, 1876.

*To all whom it may concern:*

Be it known that I, JOHN W. CRAIG, of Kirkwood, in the county of Warren and State of Illinois, have invented certain new and useful Improvements in Clothes-Pins; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention relates to improvements in pins for securing clothes or other articles on lines; and the invention consists in constructing and combining the two parts to form the pin or clamp, as hereinafter described, and set forth in the claims hereto annexed.

Figure 1:
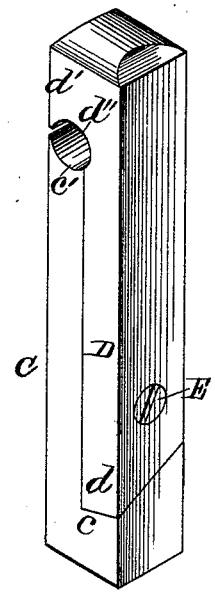
Figure 2:
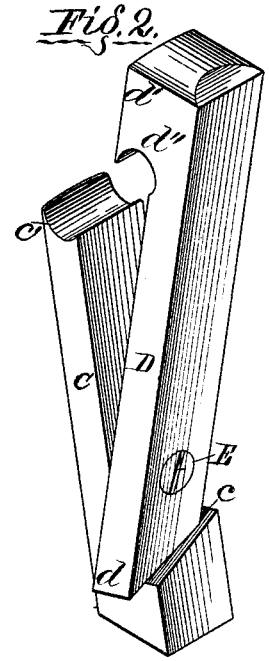
Figure 3:
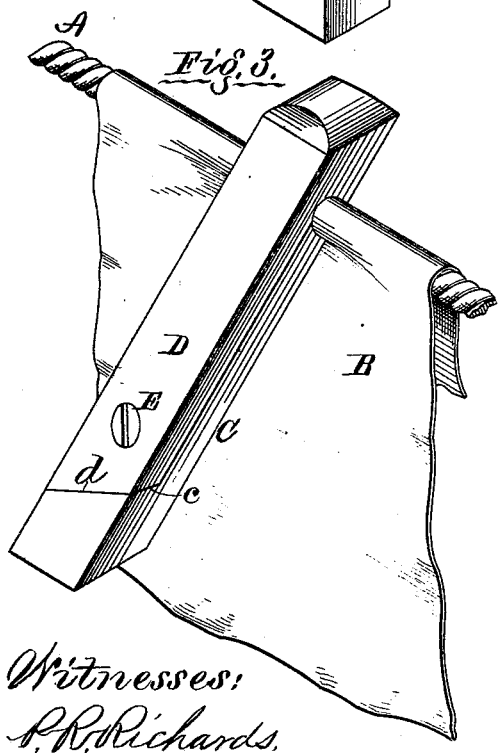
Figure 4:
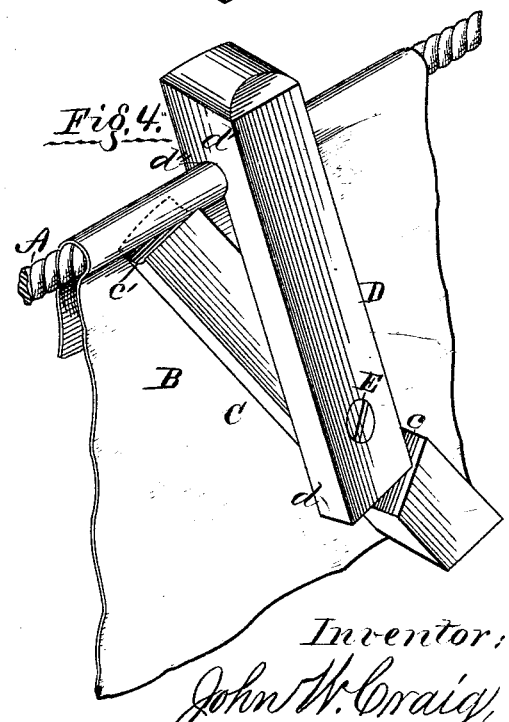

In the accompanying drawing, Figure 1 is a perspective view of the pin alone in its closed form. Fig. 2 is a perspective view of the pin alone in its unclosed form. Fig. 3 is a perspective view of my invention, shown locked in place upon an article of cloth on a clothes-line. Fig. 4 is a perspective of the same parts shown at Fig. 3, and the pin shown unlocked.

Referring to the parts by letters, letter A represents a short section of any ordinary clothes-line, and B represents an article of clothing or other flexible article suspended thereon. My clothes-pin consists of two parts, C and D. The part C is cut away, as shown in the drawings, so as to leave its main portion only about one-half the thickness of one end, which is left full thickness to form a shoulder, $c$, which is cut obliquely, as shown plainly at Fig. 3. The thin end of the part C has a transverse groove, $c'$, cut in its end. The part D is cut away, as shown in the drawings, to adapt it to fit the part C, its thin end $d$ being cut obliquely to correspond with the shoulder $c$ of the part C, and its shoulder $d'$ being cut with a groove, $d''$, to correspond with the groove $c'$ in the part C. The parts C and D are put together, as shown in the drawings, and united by a pivot-screw, E, on which they may be turned to separate their grooved ends $c'$ $d''$, and in which position they may be placed, as shown at Fig. 4, in relation to the line A and cloth B, preparatory to being pressed and closed together, as shown at Fig. 3, for the purpose of securing the article B on the line A. The manner of removal from the cloth B and line A is obvious. The bevels $d$ and $c$, as shown at Fig. 3, will act as guides to secure the parts C and D in line when closed.

Having thus described my invention, what I claim as new, and desire to secure by Letters Patent, is—

A clothes-pin made in two parts, C and D, pivoted together, the part D having an obliquely-cut end, $d$, operating against a shoulder, $c$, on the part C, and a shoulder, $d'$, extending over the end of the part C, substantially as and for the purpose specified.

In testimony that I claim the foregoing as my own I affix my signature in presence of two witnesses.

JOHN W. CRAIG.

Witnesses:
THOMAS McKEE,
D. G. STUART.